(12) United States Patent
Sundararajan et al.

(10) Patent No.: US 10,248,341 B2
(45) Date of Patent: *Apr. 2, 2019

(54) OVERLAPPING WRITE DETECTION AND PROCESSING FOR SYNC REPLICATION

(71) Applicant: NetApp Inc., Sunnyvale, CA (US)

(72) Inventors: Manoj V. Sundararajan, Sunnyvale, CA (US); Ching-Yuk Paul Ngan, Redwood City, CA (US); Yuedong Mu, San Jose, CA (US); Susan M. Coatney, Cupertino, CA (US)

(73) Assignee: NetApp Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/933,556

(22) Filed: Mar. 23, 2018

(65) Prior Publication Data

US 2018/0217771 A1 Aug. 2, 2018

Related U.S. Application Data

(63) Continuation of application No. 15/588,726, filed on May 8, 2017, now Pat. No. 9,959,064, which is a continuation of application No. 14/472,782, filed on Aug. 29, 2014, now Pat. No. 9,645,753.

(51) Int. Cl.
*G06F 3/06* (2006.01)

(52) U.S. Cl.
CPC ............ *G06F 3/0619* (2013.01); *G06F 3/065* (2013.01); *G06F 3/067* (2013.01)

(58) Field of Classification Search
CPC ........ G06F 3/0619; G06F 3/065; G06F 3/067; G06F 11/2087; G06F 11/2074; G06F 11/2064; G06F 12/0815; G06F 12/0813; G06F 17/30371; G06F 17/30176
See application file for complete search history.

(56) References Cited

U.S. PATENT DOCUMENTS

| 6,338,126 B1 | 1/2002 | Ohran et al. |
| 6,516,327 B1 * | 2/2003 | Zondervan ........ G06F 17/30581 |
| 6,671,757 B1 * | 12/2003 | Multer ................ H04L 67/1095 |
| | | 707/999.201 |

(Continued)

OTHER PUBLICATIONS

Non-Final Office Action cited in U.S. Appl. No. 15/588,726 dated Jul. 26, 2017, 15 pgs.

(Continued)

*Primary Examiner* — Hiep T Nguyen
(74) *Attorney, Agent, or Firm* — Cooper Legal Group, LLC

(57) ABSTRACT

A primary write request that is to modify a primary portion of primary data stored in a primary storage node is received. The primary write request is to be replicated to create a current secondary write request. The current secondary write request is to modify a current secondary portion of secondary data that is stored in a secondary storage node. A current data range of the current secondary portion is determined. A determination is made of whether a previous secondary write request is in process of modifying a previous data range that at least partially overlaps with a current data range of the current secondary portion. Execution of the primary write request is suspended, until the previous secondary write request has completed updating the secondary storage node.

20 Claims, 9 Drawing Sheets

(56) References Cited

U.S. PATENT DOCUMENTS

| | | | |
|---|---|---|---|
| 7,467,265 | B1 | 12/2008 | Tawri et al. |
| 7,693,882 | B2* | 4/2010 | Lee .................. G06F 17/30575 |
| | | | 707/634 |
| 7,885,923 | B1 | 2/2011 | Tawri et al. |
| 8,401,997 | B1 | 3/2013 | Tawri et al. |
| 9,645,753 | B2 | 5/2017 | Sundararajan et al. |
| 2004/0260873 | A1* | 12/2004 | Watanabe ........... G06F 11/2058 |
| | | | 711/114 |
| 2004/0267801 | A1 | 12/2004 | Dunsmore et al. |
| 2009/0235185 | A1* | 9/2009 | Gill ........................ G06F 9/542 |
| | | | 715/760 |
| 2010/0049926 | A1 | 2/2010 | Fuente et al. |
| 2010/0049927 | A1 | 2/2010 | Fuente et al. |
| 2011/0099342 | A1 | 4/2011 | Ozdemir |
| 2012/0054437 | A1 | 3/2012 | Huang et al. |

OTHER PUBLICATIONS

Reply Non-Final Office Action cited in U.S. Appl. No. 15/588,726 dated Oct. 22, 2017, 11 pgs.
Notice of Allowance cited in U.S. Appl. No. 15/588,726 dated Jan. 31, 2018, 21 pgs.
Non-Final Office Action cited in U.S. Appl. No. 14/472,782 dated Jul. 20, 2016, 17 pgs.
Reply Non-Final Office Action cited in U.S. Appl. No. 14/472,782 dated Oct. 18, 2016, 17 pgs.
Notice of Allowance cited in U.S. Appl. No. 14/472,782 dated Jan. 3, 2017, 19 pgs.

* cited by examiner

OVERLAPPING WRITE DETECTION AND PROCESSING FOR SYNC REPLICATION

RELATED APPLICATION

This application claims priority to and is a continuation of U.S. patent application Ser. No. 15/588,726, filed on May 8, 2017 and titled "OVERLAPPING WRITE DETECTION AND PROCESSING FOR SYNC REPLICATION," which is a continuation of U.S. Pat. No. 9,645,753, filed on Aug. 29, 2014 and titled "OVERLAPPING WRITE DETECTION AND PROCESSING FOR SYNC REPLICATION," which are incorporated herein by reference.

BACKGROUND

Aspects of this disclosure generally relate to the field of distributed storage, and, more particularly, to syncing data that is replicated across at least two storage nodes in a distributed storage system.

Whether maintaining customer data or their own data, businesses demand always available or highly available data and protection of that data. To support these demands, data often resides across multiple storage systems in multiple sites that are often great distances apart. One of the reasons these sites are great distances apart is to avoid a single catastrophe impacting data availability. Metrics used to define the availability requirements include recovery point objective (RPO) and recovery time objective (RTO). A business specifies an RTO as the maximum amount of time that the business tolerates lack of access to the business' data. A business specifies an RPO as the amount of data in terms of time that can be lost due to an interruption. For instance, a business can specify an RTO as 15 seconds. In other words, the business will accept at most 15 seconds from the time of a service interruption or failure to the time their data is again available. For an RPO, a business can specify 5 seconds. That means that the business will not accept losing any more than the data written (e.g., new writes, updates, etc.) in the 5 seconds that precede a failure or interruption.

Storage features to support the availability and protection demands of businesses across storage systems have been given various names, such as snapshotting, mirroring, cloning, and replicating. Each of these storage features can also vary by the provider of the storage feature and/or storage product. Despite the variations, each storage feature provides a consistent view of a business' data.

BRIEF DESCRIPTION OF THE DRAWINGS

The present aspects may be better understood, and numerous objects, and advantages made apparent to those skilled in the art by referencing the accompanying drawings.

DETAILED DESCRIPTION OF EXAMPLE ILLUSTRATIONS

Figure 1:
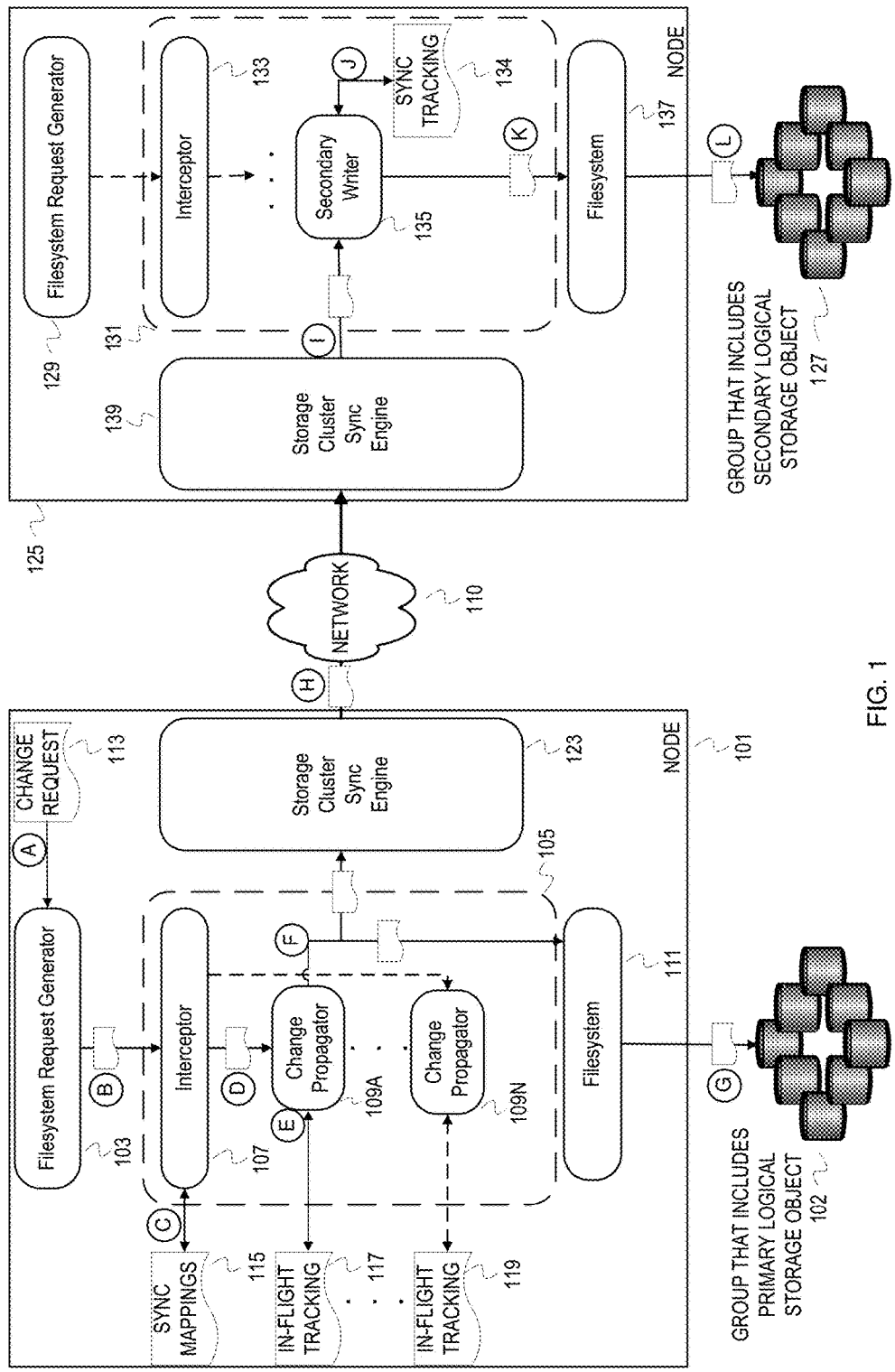
FIGS. 1 and 2 depict example storage object cluster synchronization engines coordinating a data change between primary and secondary logical storage objects in different clusters responsive to a change request, according to some aspects.

The description that follows includes exemplary systems, methods, techniques, instruction sequences and computer program products that embody techniques of various aspects. However, it is understood that the described aspects may be practiced without these specific details. For instance, although examples refer to a primary storage node and a secondary storage node being located in two different storage clusters, in accordance with some aspects, the primary storage node and the secondary storage node can be in a same cluster. In other instances, well-known instruction instances, protocols, structures and techniques have not been shown in detail in order not to obfuscate the description.

Synchronization ("sync") replication includes replicating data stored in a primary storage node in a separate copy stored at a secondary storage node. This allows the primary data stored in the primary storage node to remain in sync with the secondary data stored in the secondary storage node. Therefore, when a write request (primary write request) is received to update data stored in the primary storage node, the write request is replicated to create a separate write request (secondary write request) that is transmitted to the secondary storage node to perform an update to the corresponding data therein. This allows the secondary data to remain in sync with the primary data. Executing the write requests in the order received at the primary storage node maintains an accurate replication of the data. In conventional systems, a file system serializes the write operations to preclude multiple write operations from updating a same portion of data in the data storage at a same time. Accordingly, if a first write operation is currently updating a portion of data, the file system can preclude a second write operation from performing an update to the portion of data until the first write operation has completed. As further described below according to some aspects, the sync replication to create the secondary write request can occur external to the file system. Because the sync replication can occur external to the file system, the file system does not serialize and maintain an order of the write operations that are part of the sync replication at the secondary storage node. Some aspects, therefore, include overlapping write detection and processing to maintain an order of the write operations that are part of the sync replication at the secondary storage node. Thus, the sync replication to create the secondary write request can occur after overlapping write detection and processing.

Accordingly, some aspects provide sync replication at a primary storage node using overlapping write detection and processing based on write requests that are created and processed external to a file system. As further described below, the overlapping detection and processing of the write requests ensures that the order that the write requests are received by the secondary storage node is the order in write requests are executed to update the secondary write data.

Figure 2:
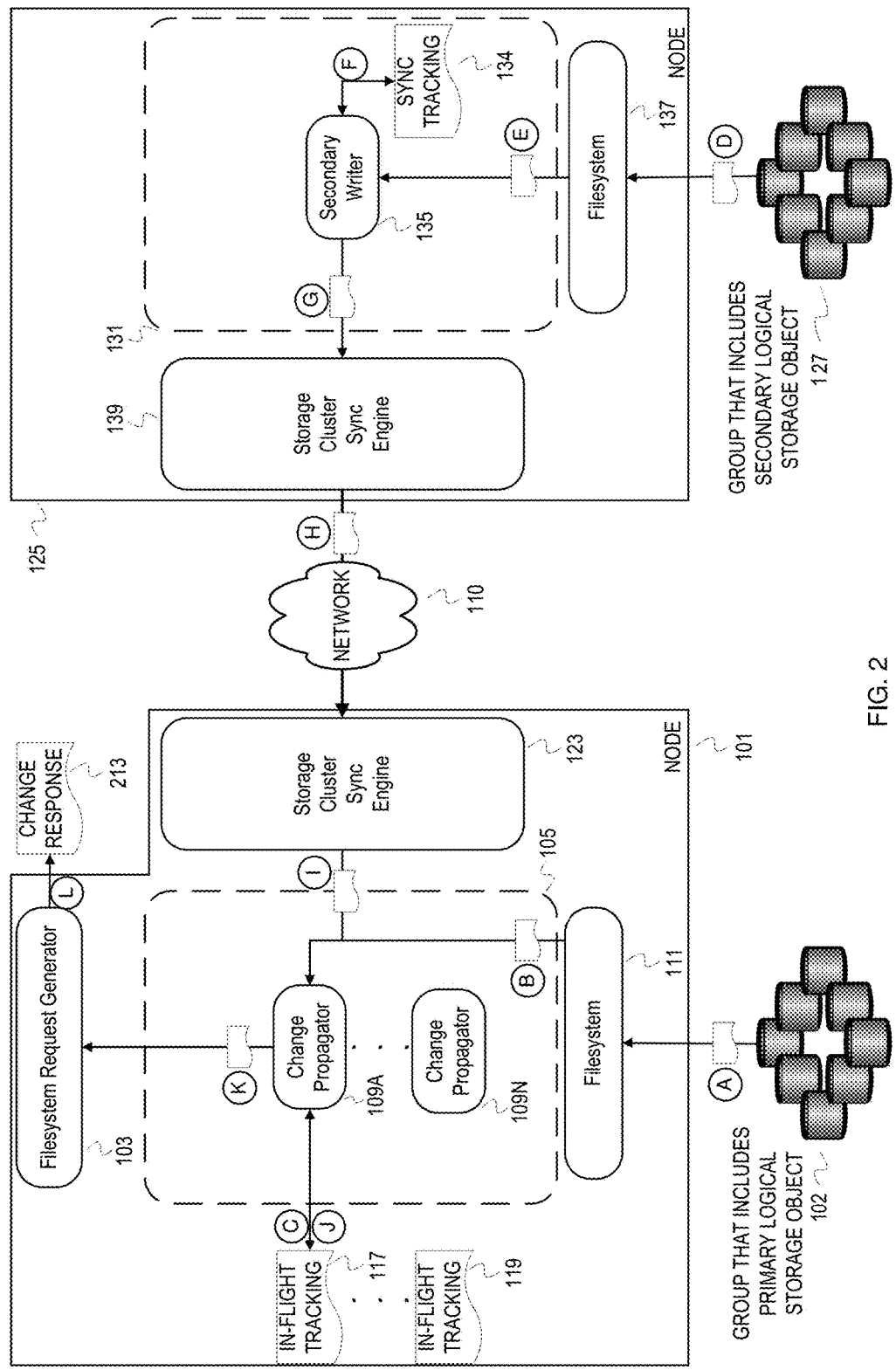
Figure 3:
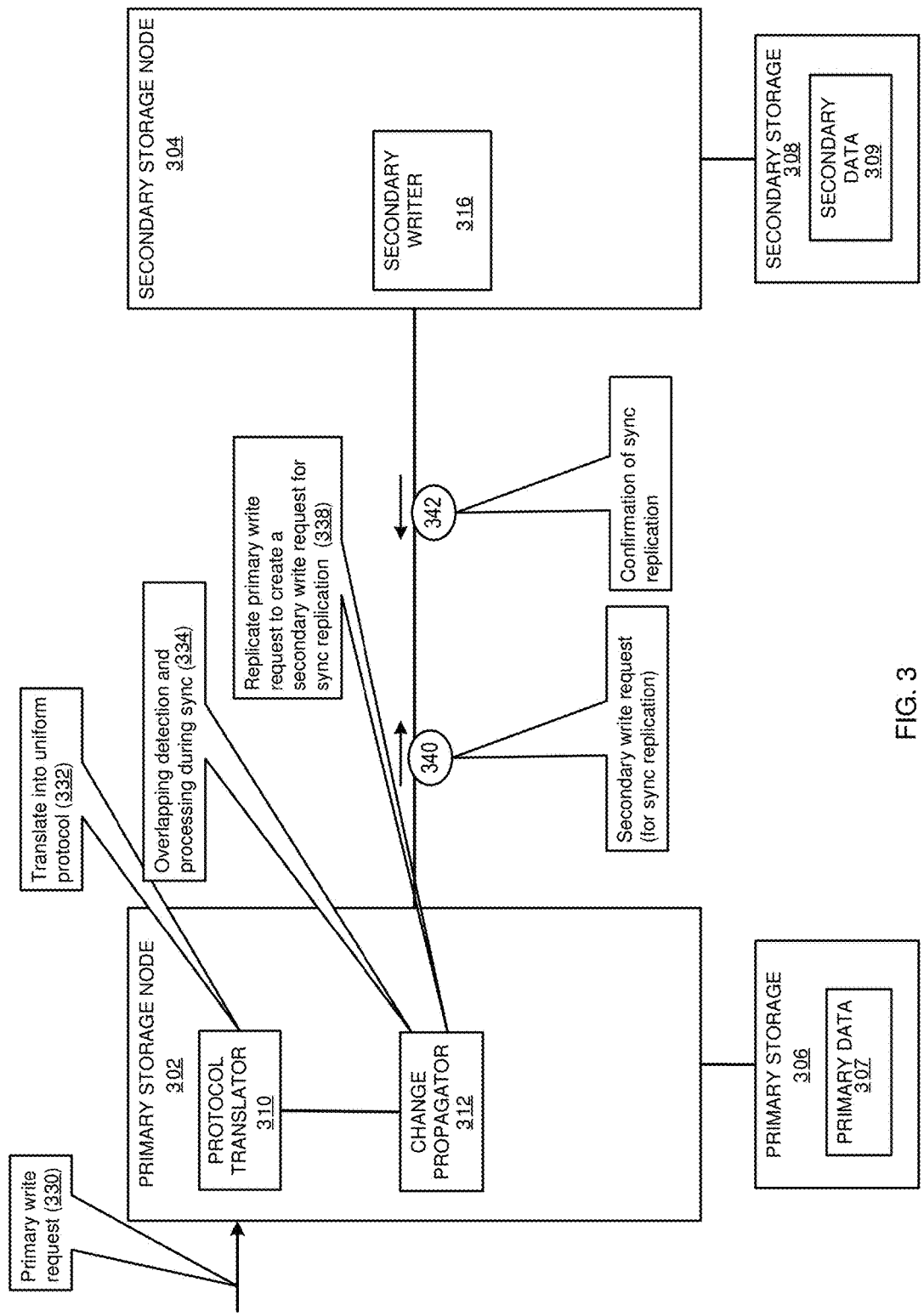
FIG. 3 depicts operations and messaging in a distributed storage system to enable overlapping write detection and processing for sync replication, according to some aspects.

The example illustrations depicted in FIGS. 1-3 depict different degrees of example details as an attempt to avoid presenting an overwhelming amount of information about the systems. Every possible data structure and every possible modularization of functionality is not presented since they are numerous and not necessary to understanding aspects of the disclosure. For instance, data structures presented as multiple data structures can be organized differently with a variety of possible indexing/accessing schemes and arrangement of data. Similarly, the functionality presented as individual modules/engines/units in the example illustrations can also be organized differently in accordance with any one of platform (operating system and/or hardware), application ecosystem, interfaces, programmer preferences, programming language, etc. In addition, some functionality is described later in the description also as an attempt to avoid presenting an overwhelming amount of information.

FIGS. 1 and 2 depict example storage cluster synchronization engines coordinating a data change between primary and secondary logical storage objects in different clusters responsive to a change request, according to some aspects. FIG. 1 depicts propagation of the change request from a primary managing storage element to a secondary managing storage element. Managing storage elements will be referred to hereafter as nodes for brevity. In FIG. 1, a first cluster includes a primary node 101 and a second cluster includes a secondary node 125. Entire clusters are not depicted for simplification of the figure and due to drawing space constraints. The primary node 101 is communicatively coupled with hosting storage elements that host a group 102 of logical storage objects. The group 102 includes a primary logical storage object. The primary node 101 includes a filesystem request generator 103, a change propagation engine 105, a storage cluster synchronization engine 123, and a filesystem 111. The filesystem request generator 103 generates a filesystem request from a storage protocol based request. The change propagation engine 105 includes an interceptor 107, a change propagator 109A, and a change propagator 109N. These modules in the primary node 101 access data depicted in FIG. 1 as sync mappings 115, in-flight tracking data 117, and in-flight tracking data 119. The sync mappings 115 indicate synchronization configurations among logical storage objects (also referred to herein as synchronization relationships or sync relationships). For example, a primary logical storage object can have a full sync relationship with one secondary logical storage object and a semi-sync relationship with another secondary logical storage object. In-flight tracking data tracks progress or state of requests from the perspective of corresponding change propagators. In other words, each change propagator instance maintains in-flight tracking data for the corresponding logical storage objects that have a sync relationship.

The secondary node 125 can include all of the same modules/engines as the primary node 101. In FIG. 1, some of the modules are not depicted to reduce repetition. The secondary node 125 is depicted as including a filesystem request generator 129 a storage cluster synchronization engine 139, a change propagation engine 131, and a filesystem 137. The change propagation engine 131 includes an interceptor 133 and a secondary writer 135. The secondary writer 135 of the secondary node 125 accesses data depicted in FIG. 1 as sync tracking data 134. The sync tracking data 134 indicates progress or state of requests from the perspective of the secondary writer 135. The sync tracking data 134 is not necessarily contained within the change propagation engine 131. The sync tracking data 134 is merely depicted near the secondary writer 135 for this description. The secondary node 125 is communicatively coupled with hosting storage elements that host a group 127 of logical storage objects. The group 127 includes a secondary storage object.

Although there may be some variation in functionality across different nodes, the functionality of modules having a same name will be generally the same in this illustration. The filesystem request generators 103, 129 generate filesystem requests based on storage protocol input/output (I/O) requests passed to the filesystem generators 103, 129. The filesystem generators 103, 129 can receive storage protocol I/O requests from a network stack, a small computer system interface (SCSI) stack, Internet SCSI (iSCSI) module, etc. Examples of storage protocol I/O requests include storage area network (SAN) requests and network attached storage (NAS) requests. The filesystem generators 103, 129 generate the filesystem requests based on the filesystem implemented on their node. The interceptors 107, 133 intercept requests from the filesystem request generators 103, 129. Intercepting can be implemented differently. An application programming interface can be modified so that the underlying functionality changes without changing the interface presented to callers. As another example, a monitoring process can monitor an execution queue and redirect a call when a specified address occurs in the execution queue. The filesystems 111, 137 access the underlying hosting storage element in accordance with filesystem requests. The storage cluster synchronization engines 123, 139, process communications in accordance with a protocol implemented via the network 110. As examples, the protocols implemented by the engines 123, 139 can be any one or more of Fibre Channel (FC), Fibre Chanel over Ethernet (FCoE), Internet Fibre Channel protocol (iFCP), and a tunneling protocol. Regardless of the specific protocol, the engines 123, 139 implement a protocol that supports an active connection that can be perceived as a direct connection between machines despite distance and hops between the machines.

FIG. 1 depicts example operations with a series of stages identified by the letters A-N. The suggested ordering of operations by the letters is limited to this illustrated example and should not be used to limit scope of the claims. At a stage A, the primary node 101 receives a change request 113. The change request 113 originates from a client that might be at a managing node (e.g., cluster manager), at a user node (e.g., a customer's server), etc. The filesystem request generator 103 processes the change request 113, generates a filesystem request based on the change request and invokes code to pass the filesystem request 113 to the filesystem 111. As part of generating the filesystem request 113, the filesystem request generator 103 translates the logical storage object identifier indicated as a target in the change request into filesystem location information of the logical storage object. But the filesystem request generator 103 also indicates the logical storage object identifier to travel with the filesystem request. The logical storage object identifier can travel with the filesystem request in different manners. For example, a filesystem generator can write the logical object identifier into metadata of the filesystem request. As another example, a filesystem generator creates a data structure and associates it with the filesystem. Instead of the filesystem 111 receiving the filesystem request, the interceptor 107 receives the filesystem request at stage B. The request in its various forms (e.g., storage protocol I/O request, filesystem request, etc.) is no longer identified with the label 113 since the change being requested is the same despite the form of the request.

At stage C, the interceptor 107 accesses sync mappings 115 to determine any sync relationships relevant to the filesystem request. The filesystem request indicates a logical storage object in group 102 (in terms of the filesystem location information) that is a target of the filesystem request. The interceptor 107 accesses the sync mappings 115 to determine any sync relationships defined for the filesystem request target. The target may have a single sync relationship, multiple sync relationships, or no sync relationships. If the target has no sync relationships, then the filesystem request would be passed off to the filesystem 111. For this illustration, the sync mappings 115 indicate that the target has a full sync relationship with a logical storage object in the group 127. Since the target of the filesystem request has a sync relationship, the target of the filesystem request can be considered the primary logical storage object. As stated previously, the logical storage objects are identified by immutable identifiers that are exclusive at least across clusters that are associated with each other. The sync mappings, which may be indicated in one or more data structures, map the sync relationships across the levels or layers of the logical object or filesystem request target depending upon the logical object (e.g., file, LUN, etc.) and underlying filesystem. For example, the logical object may be a file. The logical object identifier will initially be the file identifier or file handle. The filesystem resolves a write request targeting the file handle to impacted data blocks. The filesystem may resolve through any number of inode levels, for example. When there is a sync relationship, the sync mappings not only map the higher level identifier (i.e., the logical object identifier) at the primary node to the higher level identifier at the secondary node, but the sync mappings also map the lower level identifiers (i.e., filesystem location information). In this example case, the lower level identifiers would be the inode identifiers. The primary node inode identifiers for the part of the file being targeted would map to inode identifiers on the secondary node for the part of the file being targeted.

At stage D, the interceptor 107 passes the filesystem request and an indication of the sync relationship for the target to the change propagator 109A. If the primary node 101 has not yet received a change request that targets the same primary logical storage object as indicated in the change request 113, then the interceptor 107 may invoke code that instantiates the change propagator 109A. Although not necessary, a change propagator is instantiated per primary logical storage object in this illustration. The interceptor 107 can indicate the sync relationship for the primary logical storage object to the change propagator in various manners. For example, the interceptor 107 can call a function that instantiates change propagators with the primary logical storage object identifier as a parameter value and the secondary logical storage object identifier as a parameter value. As another example, the interceptor 107 can send an inter-process communication to an already instantiated change propagator 109A along with a reference to the filesystem request stored in a local memory. To illustrate the per primary logical storage object instantiations of change propagators, the change propagator 109N is depicted with a dashed line to the in-flight tracking data 119. The dashed line is used to indicate that the change propagator 109N may be accessing the in-flight tracking data 119 for a different filesystem request.

At stage E, the change propagator 109A creates a filesystem request targeting the secondary logical storage object of the sync relationship and updates the in-flight tracking data 117. If the change propagator 109A has just been instantiated, then there may not yet be a structure for tracking data or there may be an empty structure. The change propagator 109A updates the in-flight tracking data 117 to indicate that a filesystem request targeting the primary logical storage object is in-flight (i.e., will be sent or is being sent). The change propagator 109A updates the in-flight tracking data 117 to also indicate that a filesystem request targeting the secondary logical storage object is in-flight. The change propagator 109A then (or concurrently) creates the request with an identifier of the secondary logical storage object that has a full sync relationship with the primary logical storage object. The change propagator 109A creates this filesystem request with a different requestor as well. The change propagator 109A indicates the change propagator 109A as the requestor. The change propagator 109A can be identified with various data that exclusively identifies the change propagator 109A within any associated clusters, such as a combination of a process/thread identifier of the change propagator 109A and a network address of the primary node 101. The change propagator 109A can also incorporate the primary logical storage object identifier into the indication of the requestor. The filesystem request targeting the primary logical storage object sent from the change propagator 109A will be referred to as the primary change request. The filesystem request targeting the secondary logical storage object sent from the change propagator 109A will be referred to as the secondary change request.

At stage F, the change propagator 109A sends the filesystem requests for servicing. Because the primary logical storage object has a full sync relationship with the secondary logical storage object, the primary node 101 will not respond to the change request 113 until the change has been made at both the primary and secondary logical storage objects. Therefore, the change propagator 109A can send the primary and secondary change requests in any order. The change propagator 109A sends the primary change request to the filesystem 111. The change propagator 109A sends the secondary change request to the storage cluster sync engine 123. After the change requests are passed from the change propagator 109A, timing of the operations can vary depending on network conditions, differences in node capabilities, etc.

At stage G, the filesystem 111 accesses the hosting storage element.

At stage H, the storage cluster sync engine 123 processes the secondary change request in accordance with a protocol of a connection between the storage cluster sync engine 123 and the storage cluster sync engine 139 that traverses the network 110. The storage cluster sync engine 123 can construct a new request in accordance with the connection protocol and populate the new request with the relevant information from the secondary change request (e.g., secondary logical storage object identifier, data to be written, etc.). The storage cluster sync engine 123 may encapsulate the secondary change request with a header compliant with the connection protocol. For this illustration, the sync mappings at the primary node map logical object identifiers (e.g., file handles) between the primary node and the secondary node as well as map the filesystem location information (e.g., inode identifiers). The secondary change request is constructed with the secondary node filesystem location information of the data blocks impacted by the change request. In some cases, the filesystem location information sync mappings will be separate from the logical object identifier sync mappings. And the filesystem location information sync mappings may be maintained at the secondary node. In those cases, the secondary change request is constructed with indications of the targeted logical object and the filesystem location information of the primary node. When received, the secondary node will access the sync mappings and resolve the primary node filesystem location information to the secondary node filesystem location information.

At stage I, the storage cluster sync engine 139 processes the received request in accordance with the connection protocol and passes the secondary change request to the secondary writer 135. The storage cluster sync engine 139 may reconstruct the secondary change request from the received request or extract the secondary change request from the received request. If no secondary change requests have been received yet, the storage cluster sync engine 139 may invoke code to instantiate the secondary writer 135. The storage cluster sync engine 139 can instantiate a secondary writer to handle all secondary change requests received by the storage cluster sync engine 139 or instantiate them per primary logical storage object and secondary logical storage object pair.

FIG. 1 depicts dashed lines from the filesystem request generator 129 and from the interceptor 133. The dashed line from the filesystem request generator 129 indicates the possibility that the filesystem request generator 129 is receiving, processing, and passing other change requests to the interceptor 133. The dashed line from the interceptor 133 to the ellipsis illustrates the possibility that the interceptor 133 is intercepting and passing change requests to change propagators of the secondary node 125 that are not depicted. These possibilities are illustrated to show that the secondary node 125 is not limited to handling secondary change requests.

At stage J, the secondary writer 135 updates sync tracking data 134. The secondary writer 135 records indications of the secondary change request that at least include the targeted secondary logical storage object, the requestor (i.e., the change propagator 109A), and state of the secondary change request. At this point, the secondary writer 135 records state as in-flight since the secondary change request is being or will be sent. At stage K, the secondary writer 135 sends the secondary change request to the filesystem 137.

At stage L, the filesystem 137 accesses a hosting storage element in accordance with the secondary change request.

FIG. 2 depicts responses to the primary and secondary change requests processed in accordance with the full sync relationship defined in the sync mappings of FIG. 1. FIG. 2 depicts example operations with stage labels A-L. The stages A-J are depicted as if the response from the hosting storage element of the primary logical storage object responds before the secondary node 125. However, that ordering is not necessary. In some cases, the secondary node 125 may be able to respond to the change propagator 109A before the hosting storage element of the primary logical storage object can respond to the primary node 101. Regardless of the timing of responses, a response to the requestor is not provided until changes at both the primary and secondary logical storage objects have been confirmed by the change propagator 109A. Some elements from FIG. 1 have been removed to simplify FIG. 2.

Stages A-C illustrate a response traveling from the hosting storage element of the primary logical storage object to the change propagator 109A and a corresponding update of the in-flight tracking data 117. At stage A, a hosting storage element that hosts the primary logical storage object supplies a response to the filesystem 111. The filesystem 111 forwards the response to the change propagator 109A at stage B. At stage C, the change propagator 109A updates the in-flight tracking data 117 to indicate that the primary change request has been performed in the primary logical storage object.

Stages D-J illustrate a response traveling from the hosting storage element of the secondary logical storage object to the change propagator 109A and a corresponding update of the in-flight tracking data 117. At stage D, a hosting storage element that hosts the secondary logical storage object supplies a response to the filesystem 137. The filesystem 137 forwards the response to the secondary writer 135 at stage E. At stage F, the secondary writer 135 updates the sync tracking data 134 to reflect the update to the secondary logical storage object. For example, the secondary writer 135 uses a combination of the secondary logical storage object identifier and the requestor of the forwarded response to look up an entry in a structure that hosts the sync tracking data 134. The secondary writer 135 sets a value or flag in the entry to indicate that the change has been completed to the secondary logical storage object. The secondary writer 135 then forwards the response to the storage cluster synchronization engine 139. The storage cluster synchronization engine 139 determines that the response to the secondary change request ("secondary response") is to be sent to the primary node 101. The storage cluster synchronization engine 139 processes the secondary response in accordance with the connection protocol and sends the secondary response over the connection via the network 110 at stage H. At stage I, the storage cluster synchronization engine 123 processes the secondary response in accordance with the connection protocol and forwards the secondary response to the change propagator 109A. As part of processing the secondary response, the storage cluster synchronization engine 123 can determine that the secondary response should be sent to the change propagator 109A based on the requestor identifier that incorporates a process/thread identifier of the change propagator 109A. At stage J, the change propagator 109A updates the in-flight tracking data 117 to indicate that the secondary change request has been performed in the secondary logical storage object.

After determining that all outstanding change requests corresponding to the initial change request 113 have been completed, the change propagator 109A supplies a response to the filesystem request generator 103. Each time the change propagator 109A updates the in-flight tracking data 117, the change propagator 109A can read the entry to determine whether all requests indicated in the entry have been completed or are still in-flight, for example. For this illustration, the filesystem request generator 103 maintains data that indicates the requestor that corresponds to the change request 113. When a request is initially received by the filesystem request generator 103, the request can be tagged with a request identifier that corresponds to the requestor. This request identifier can travel with the request and corresponding response. The request identifier indicates an identity of the requestor and the request to distinguish it from other requests from the same requestor. The change propagation engine 105 can be programmed to also (or instead of) maintain data that indicates the requestor of the change request 113 and that indicates the change request 113 itself. At stage L, the filesystem request generator 103 forms a change response 213 and supplies the change response 213 to the corresponding requestor.

FIG. 3 depicts operations and messaging in a distributed storage system to enable overlapping write detection and processing for sync replication, according to some aspects. FIG. 3 depicts a primary storage node 302 and a secondary storage node 304. The primary storage node 302 includes a protocol translator 310 that is coupled to a change propagator 312. The protocol translator 310 and the change propagator 312 can be hardware, software, firmware, or a combination thereof. For example, the protocol translator 310 and the change propagator 312 can be software executing on a processor. With reference to FIGS. 1-2, the change propagator 312 can be one or more of the change propagators 109A-109N. The secondary storage node 304 includes a secondary writer 316. The secondary writer 316 can be hardware, software, firmware, or a combination thereof. For example, the secondary writer 316 can be software executing on a processor. With reference to FIGS. 1-2, the secondary writer 316 can be the secondary writer 135.

The primary storage node 302 and the secondary storage node 304 can be in two different clusters. According to some other aspects, the primary storage node 302 and the secondary storage node 304 can be in a same cluster. The primary storage node 302 is coupled to a primary storage 306, which can store data (e.g., files) that can be referenced herein as primary data 307. With reference to FIGS. 1-2, the primary storage 306 can be part of the group 102 of logical storage objects. The secondary storage node 304 is coupled to a secondary storage 308, which can store data (e.g., files) that can be referenced herein as secondary data 309. With reference to FIGS. 1-2, the primary storage 306 can be part of the group 127 of logical storage objects. As further described below, the secondary data 309 can be a replication of the primary data 307.

In this example, the operations and messages depicted in FIG. 3 keep the secondary data 309 in sync with the primary data 307 (sync replication), in response to a write request to update a portion of the primary data 307. The primary storage node 302 receives a primary write request 330. With reference to FIG. 1, one of the clients can transmit the primary write request 330 to be received by the primary storage node 302. The primary write request 330 can be a request to update a portion of the primary data 307. The protocol translator 310 can translate or convert a protocol of the primary write request into a uniform protocol (332) to create a filesystem request. Specifically, different primary write requests received by the primary storage node 302 can be based on different protocols. The filesystem request can then be used to update the primary data 307 in the primary storage 306 at a file level (e.g., updates to particular files, directories, etc.). For example, the primary storage 306 can be a Network Attached Storage (NAS) device.

After the protocol translation, the change propagator 312 replicates the primary write request to create a secondary write request for sync replication (338). The secondary write request is created and transmitted to the secondary storage node 304, where a copy of the primary data 307 has been replicated as secondary data 309 that is stored in the secondary storage 308. The secondary write request is a request to update the same portion in the secondary data 309 that is being updated in the primary data 307.

Also prior to replicating the primary write request to create the secondary write request, the change propagator 312 can determine whether the write request overlaps with another write request (334). As part of the sync replication, the change propagator 312 can perform overlapping detection and processing of the primary write request. As further described below, the overlapping detection and processing of the primary write requests ensures that the order that the secondary write requests are received by the secondary storage node is the order in secondary write requests are executed to update the secondary write data. For example, assume that the primary storage node 302 transmits (to the secondary storage node 304) a secondary write request A at a first point in time and transmits a secondary write request B at a second later point in time. Because the secondary write requests A and B are created and processed external to the file system, the file system cannot guarantee that the secondary write request A is executed before the secondary write request B. This can be especially problematic if the secondary write requests A and B are updating (at least partially) a same portion of the secondary data 309. For example, if the secondary write request A is executed after the secondary write request B for a same portion of the secondary data 309, the secondary write request A could overwrite some part of the update by the secondary write request B (which should have been the latest update). Therefore, the secondary data may not be an accurate replication of the primary data. Some aspects for overlapping detection and processing of primary write requests are described in more detail below in reference to FIGS. 5-9.

Also, the secondary write request (created by the replication) is transmitted to the secondary storage node 304 (340). After sync replication is complete, the secondary writer 316 transmits a confirmation of sync replication (342) back to the primary storage node 302. In response, the primary storage node 330 can also send a confirmation to the client (that initially transmitted the primary write request 330) that the update is complete.

Figure 4:
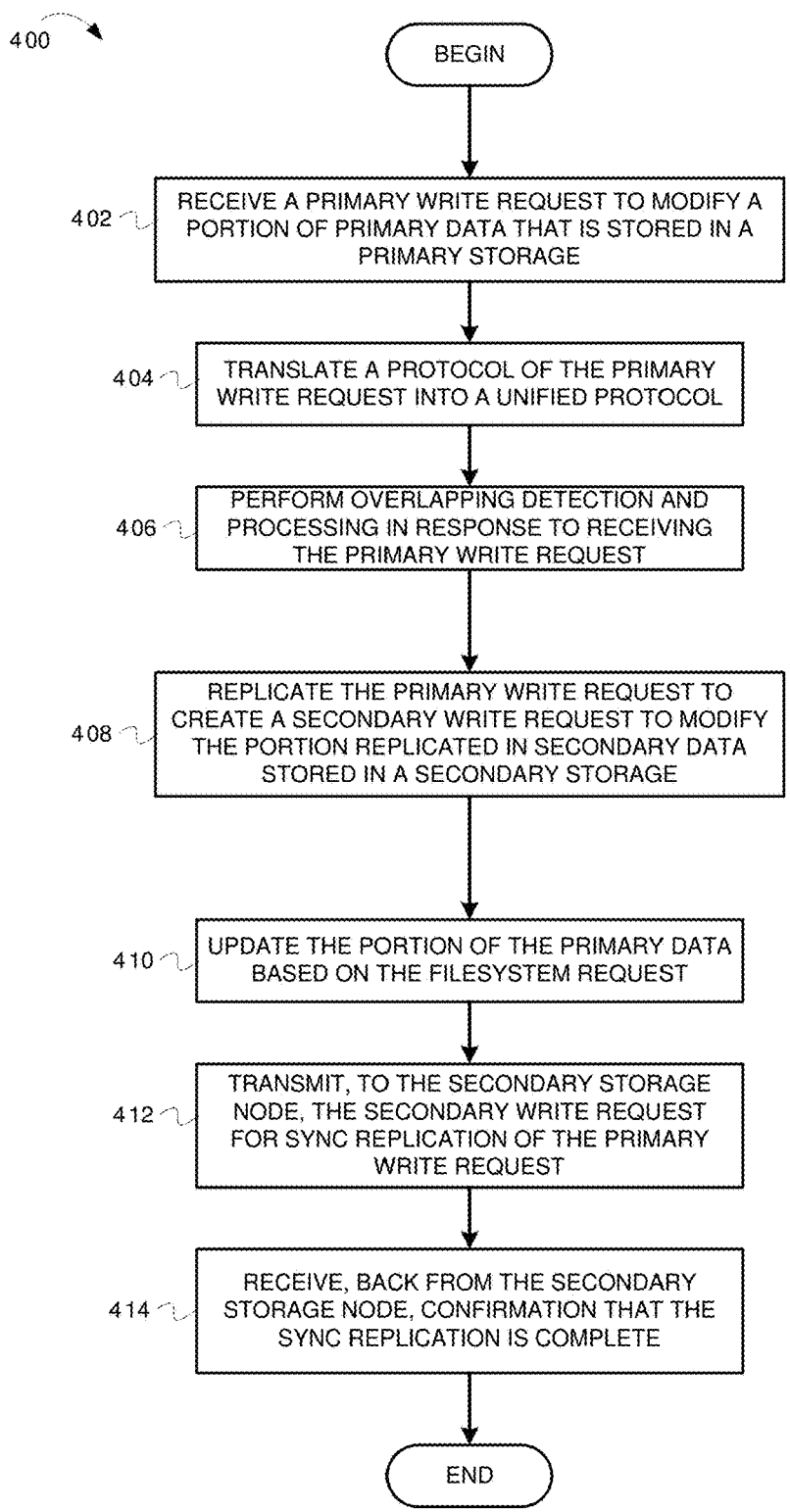
FIG. 4 depicts a flowchart of operations executing in a primary storage node to enable overlapping write detection and processing for sync replication, according to some aspects.

FIG. 4 depicts a flowchart of operations executing in a primary storage node to enable overlapping write detection and processing for sync replication, according to some aspects. A flowchart 400 of FIG. 4 is described in reference to the diagram depicted in FIG. 3. The operations of the flowchart 400 can be performed by software, firmware, hardware or a combination thereof. The operations of the flowchart 400 are described as being performed by one or more of the components executing within the primary storage node 302 of FIG. 3 (e.g., the protocol translator 310 and the change propagator 312). According to some other aspects, some or all of the operations of the flowchart 400 can be performed by other modules in other nodes or devices communicatively coupled to the primary storage node 302. For example, a separate node can perform the protocol translation and transmit its result to the primary storage node. The operations of a flowchart 400 start at block 402.

At block 402, a network adapter of the primary storage node receives a primary write request to modify a portion of primary data that is stored in the primary storage. With reference to the example depicted in FIG. 3, a client that is coupled to the primary storage node 302 can transmit the primary write request 330 to the primary storage node 302. The primary write request 330 can be a request to update an existing file, create a new file, update directory structure in the file system, etc. Operations of the flowchart 400 continue at block 404.

At block 404, the protocol translator translates a protocol of the primary write request into a unified protocol. With reference to the example depicted in FIG. 3, different primary write requests received by the primary storage node 302 can be based on different protocols. According to some aspects, protocol translation may not be required. For example, the protocol of the primary write request may already be the uniform protocol. Operations of the flowchart 400 continue at block 406.

At block 406, the change propagator performs overlapping detection and processing in response to receiving the primary write request. With reference to the example in FIG. 3, the change propagator 312 can perform overlapping detection and processing in response to receiving the primary write request 330. The operations of the overlapping detection and processing, according to some aspects, are described in more detail below in reference to FIGS. 5-6. Operations of the flowchart 400 continue at block 408.

At block 408, the change propagator replicates the primary write request to create a secondary write request to modify the portion replicated in secondary data stored in a secondary storage. With reference to the example depicted in FIG. 3, the change propagator 312 can perform this replication after a determination is made by the operations of the overlapping detection and processing that the primary write request can be replicated to create the secondary write request. The secondary write request is created and transmitted to the secondary storage node 304, where a copy of the primary data 307 has been replicated as secondary data 309 that is stored in the secondary storage 308. The secondary write request is a request to update the same portion in the secondary data 309 that is being updated in the primary data 307. This replication operation, therefore, enables the secondary data 309 to remain in sync with the primary data 307. Operations of the flowchart 400 continue at block 410.

At block 410, the portion of the primary data is updated based on the filesystem request. With reference to the example depicted in FIG. 3, the portion of the primary data 307 in the primary storage 306 is to be updated as defined by the filesystem request. For example, a particular file or directory can be modified, renamed, moved or deleted. Operations of the flowchart 400 continue at block 412.

At block 412, a network adapter of the primary storage node transmits, to the secondary storage node, the secondary write request for sync replication of the primary write request. With reference to the example depicted in FIG. 3, a network adapter (not shown) of the primary storage node 302 transmits, to the secondary storage node 304, the secondary write request for sync replication of the primary write request 330. As further described below, in response, the secondary writer 316 performs sync replication (342) such that the update to the primary data 307 is also replicated by an update to the secondary data 309 (thereby enabling the primary data 307 and the secondary data 309 to remain in sync). As part of the sync replication, the change propagator 312 performs overlapping detection and processing of the primary write request. The overlapping detection and processing of the primary write requests ensures that the order that the secondary write requests are received by the secondary storage node is the order in secondary write requests are executed to update the secondary write data. Operations of the flowchart 400 continue at block 414.

At block 414, after sync replication is complete, the secondary writer transmits a confirmation of sync replication back to the primary storage node. With reference to the example depicted in FIG. 3, the secondary writer 316 transmits a confirmation 340 back to the primary storage node 302. In response, the primary storage node 302 can also send a confirmation to the client (that initially transmitted the primary write request 330) that the update is complete. The operations of the flowchart 400 are complete.

While the flowchart 400 described operations that are sequentially order, at least some of the operations can be performed at least partially in parallel. For example, the operations for updating the portion of the primary data based on the filesystem request can be performed at least partially in parallel with transmitting the secondary write request, performing the sync replication, and/or the receiving back of confirmation of the sync replication.

Figure 5:
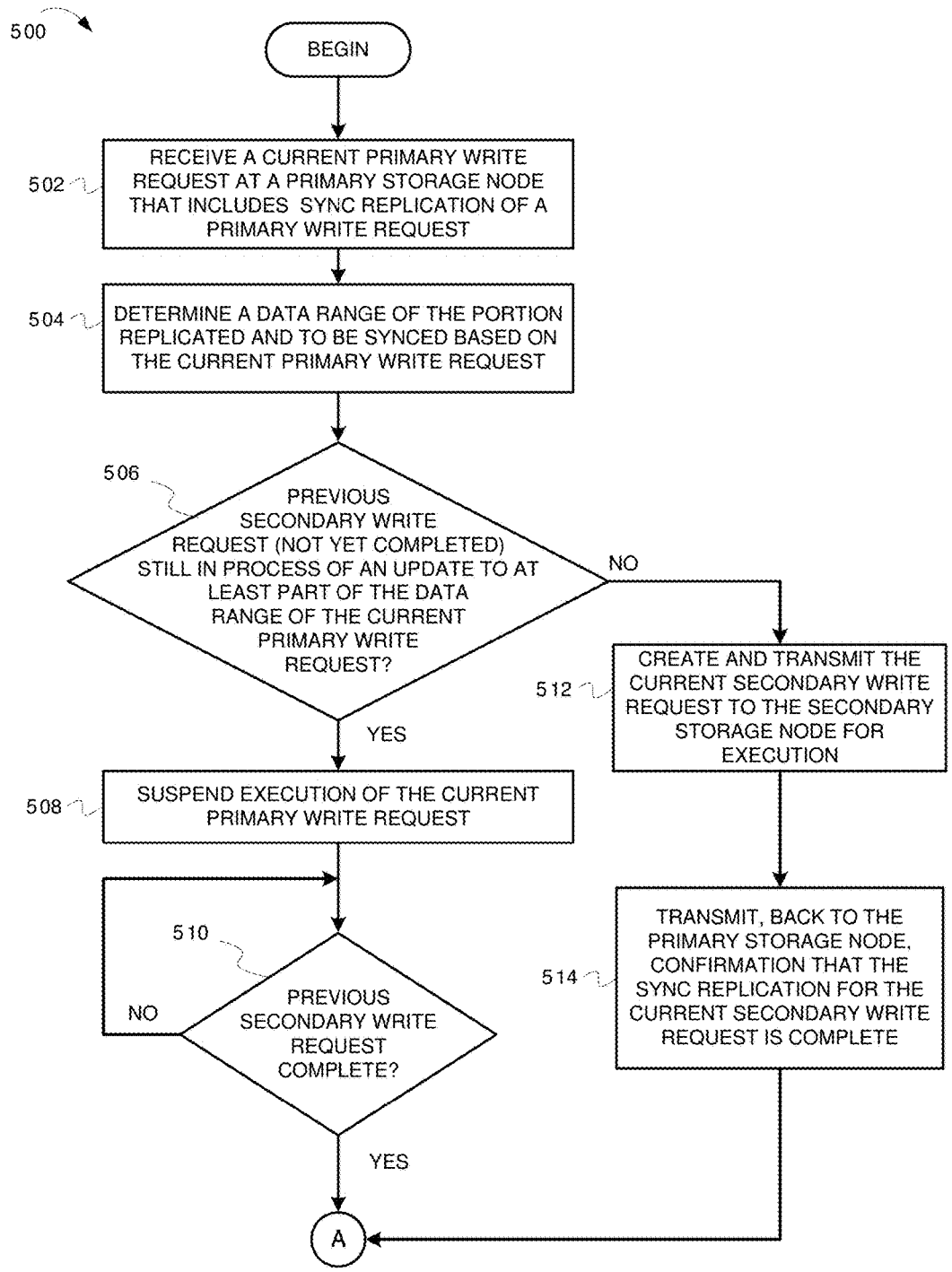
FIGS. 5-6 depict flowcharts of operations executing in a primary storage node to enable overlapping write detection and processing for sync replication, according to some aspects.
Figure 6:
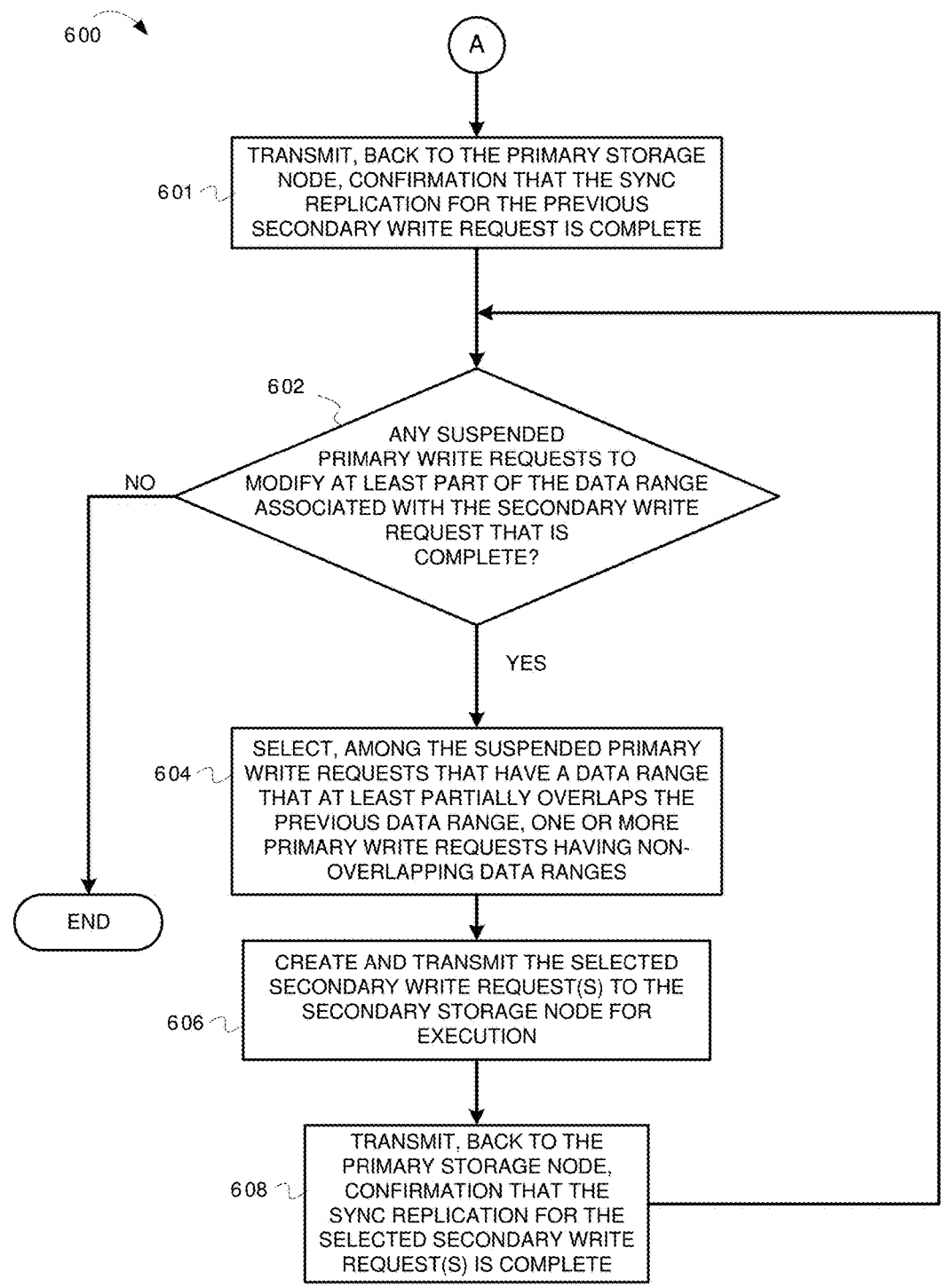

Example operations of the primary storage node for sync replication are now described. FIGS. 5-6 depict flowcharts of operations executing in a primary storage node to enable overlapping write detection and processing for sync replication, according to some aspects. Operations of a flowchart 500 of FIG. 5 continues in a flowchart 600 of FIG. 6 at transition point A. The operations of the flowcharts 500-600 can be performed by software, firmware, hardware or a combination thereof. The operations of the flowcharts 500-600 are described as being performed by a component executing within the primary storage node 302 of FIG. 3 (e.g., the change propagator 312). According to some other aspects, some or all of the operations of the flowcharts 500-600 can be performed by other modules in other nodes or devices communicatively coupled to the primary storage node 302. The operations of the flowchart 500 start at block 502.

At block 502, the change propagator receives a current primary write request that is to be replicated (to perform a sync replication of the current primary write request). With reference to the example depicted in FIG. 3, the change propagator 312 can receive the primary write request 330 after any protocol translation from the protocol translator 310. Operations of the flowchart 500 continue at block 504.

At block 504, the change propagator determines a data range of the portion that is replicated and to be synced based on the current primary write request. With reference to the example depicted in FIG. 3, the change propagator 312 can determine the data range of the portion to be updated in the secondary data 309 based on the beginning address and its offset that defines the ending address of the data range to be updated in the secondary data 309. According to some aspects, one or more data ranges can be updated for a current primary write request. If multiple data ranges are updated, the change propagator 312 can determine each of the multiple data ranges. Operations of the flowchart 500 continue at block 506.

Figure 7:
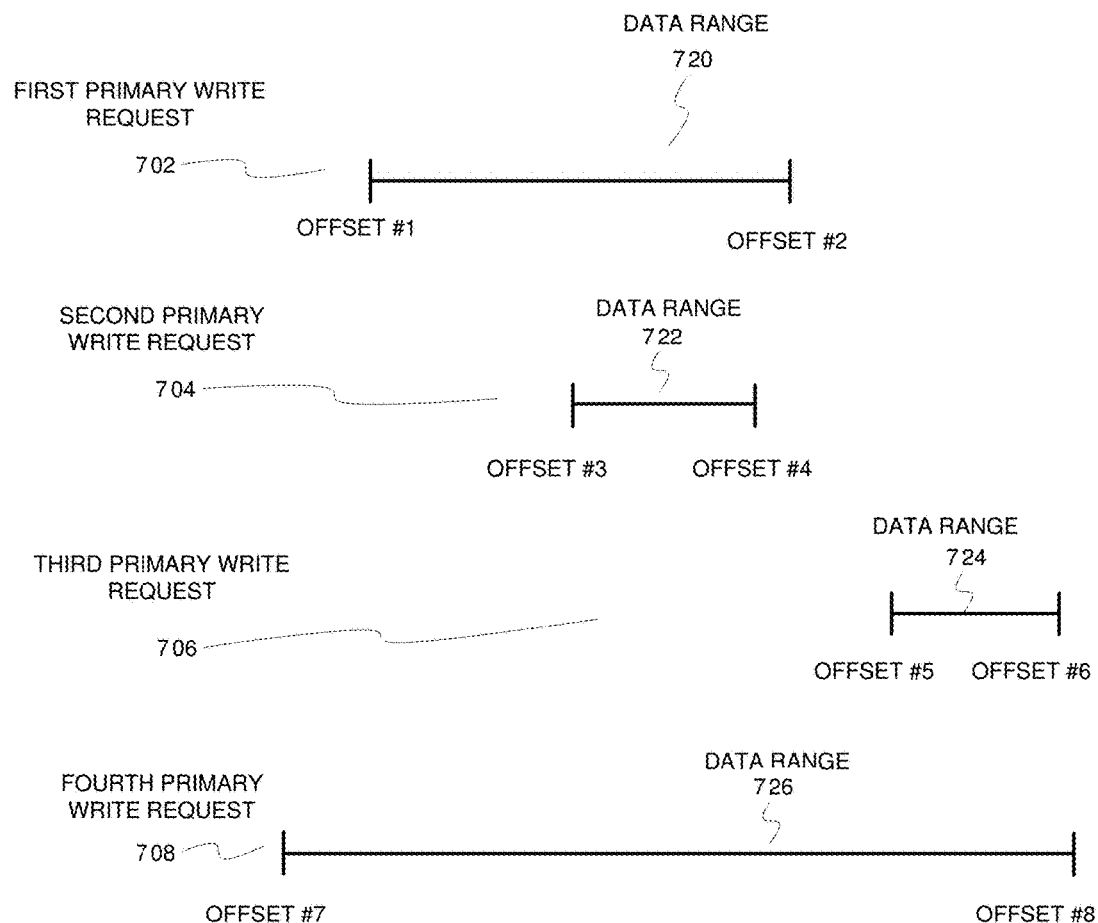
FIG. 7 depicts range locking for primary write requests for overlapping write detection and processing, according to some aspects.

At block 506, the change propagator determines whether there is a previous secondary write request (that is not yet completed execution) that is still in process of an update to at least a part of the data range defined by the current primary write request. With reference to the example depicted in FIG. 3, the change propagator 312 can make this determination. To help illustrate, FIG. 7 depicts range locking for primary write requests for overlapping write detection and processing, according to some aspects. FIG. 7 depicts a data range 720 of data to be modified in the secondary data by execution of a first primary write request 702. The data range 720 is defined to be between an offset #1 and an offset #2. A second primary write request 704 (that follows in time the first primary write request 702) defines data to be modified in the secondary data in a data range 722. The data range 722 is defined to be between an offset #3 and an offset #4. The data range 722 is within and thus overlaps with the data range 720.

A third primary write request 706 (that follows in time the second primary write request 704) defines data to be modified in the secondary data in a data range 724. The data range 724 is defined to be between an offset #5 and an offset #6. The data range 724 does not overlap with the data range 720. A fourth primary write request 708 (that follows in time the third primary write request 706) defines data to be modified in the secondary data in a data range 726. The data range 726 is defined to be between an offset #7 and an offset #8. The data range 720 is within and thus overlaps with the data range 726.

In the example depicted in FIG. 7, the first primary write request 702 can be considered a previous primary write request that has not yet completed. Also if the current primary write request being processed is the second primary write request 704 or the fourth primary write request 708, the data range of the current primary write request would overlap with the data range of the previous primary write request that has not yet completed. However if the current primary write request being processed is the third primary write request 706, the data range of the current primary write request would not overlap with the data range of the previous primary write request that has not yet completed.

Figure 8:
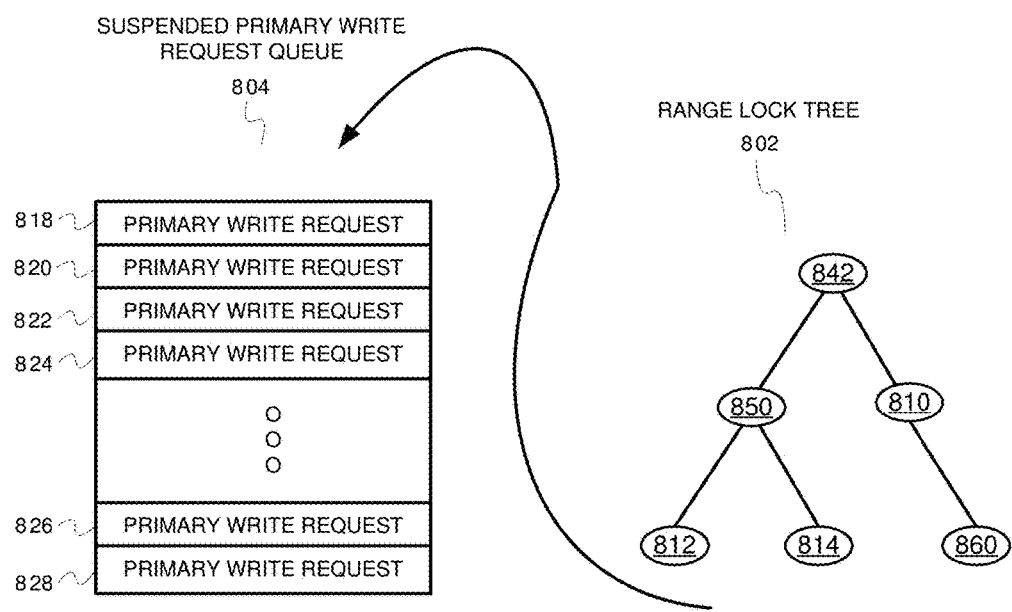
FIG. 8 depicts a range lock tree and suspended primary write request queue for overlapping write detection and processing, according to some aspects.

Different data structures can be used to store the data ranges of the primary write requests that are being executed or have been suspended from execution. To illustrate, FIG. 8 depicts a range lock tree and suspended primary write request queue for overlapping write detection and processing, according to some aspects. In particular, FIG. 8 depicts a range lock tree 802 and a suspended primary write request queue 804. The range lock tree 802 is a hierarchical tree structure with a root node and subtrees of children that include a set of linked nodes. Each node can comprise a data structure that stores a data range that is currently locked along with references to its children nodes. The range lock tree 802 includes a root node 842 that has two child nodes (a child node 850 and a child node 810). The child node 850 has two child nodes (a child node 812 and a child node 814). The child node 810 has a child node 860. Each node in the range lock tree 802 stores a data range that is currently locked because an associated secondary write request is being processed to update the data range but has not yet completed. Because two secondary write requests cannot update at a same time data ranges that overlap, the data ranges stored in the range lock tree 802 are non-overlapping relative to each other.

Returning to the operation at block 506 of the flowchart 500 in FIG. 5, the change propagator can traverse the range lock tree 802 to determine whether there is a previous secondary write request (that is not yet completed execution) that is updating a data range that overlaps with the data range defined for the current primary write request. In other words, if the change propagator cannot locate any node in the range lock tree 802 that has a data range that overlaps with the data range defined for the current primary write request, the change propagator can determine that there are no previous secondary write requests (not yet completed execution) that are updating a data range that overlaps with the data range defined for the current primary write request.

Figure 9:
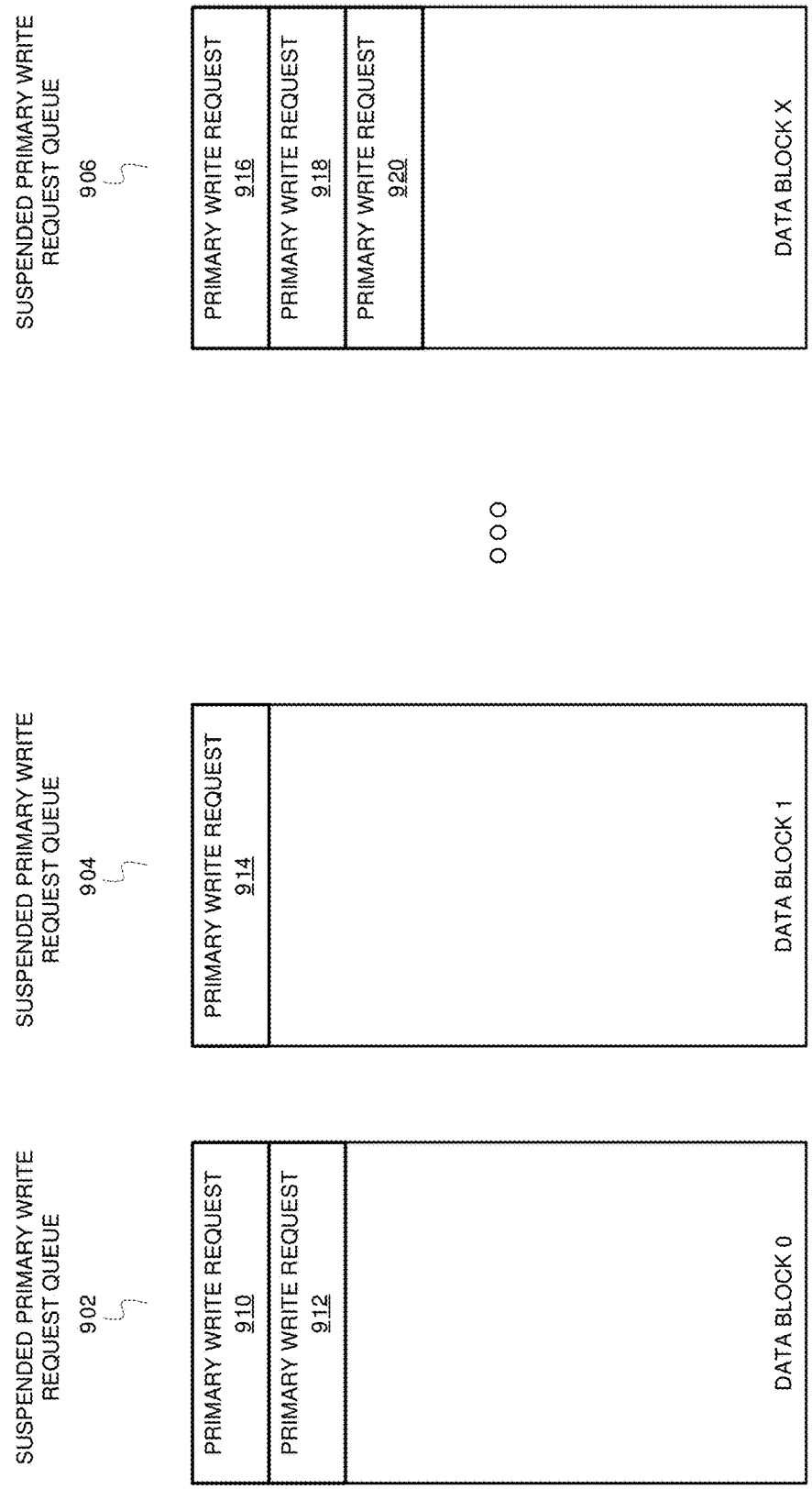
FIG. 9 depicts a number of suspended primary write request queues, wherein each suspended primary write request queue is associated with a data block to enable overlapping write detection and processing, according to some aspects.

Otherwise, if the change propagator does find a node in the range lock tree 802 that has a data range that overlaps with the data range defined for the current primary write request, the change propagator determines that there is a previous secondary write request (not yet completed execution) that is updating a data range that overlaps with the data range defined for the current primary write request. As shown in FIG. 8 by the arrow linking the range lock tree 802 to the suspended primary write request queue 804, if the current data range is found at one of the nodes of the range lock tree 802, the current primary write request is stored in the suspended primary write request queue 804. An example use of the suspended primary write request queue 804 is further described below. Also, an alternative example to the range lock tree 802 to make this determination regarding data range overlapping for primary write requests is depicted in FIG. 9 (which is further described below).

With reference to the flowchart 500 of FIG. 5, if there is a previous secondary write request (that is not yet completed execution) that is updating a data range that overlaps with the data range defined for the current primary write request, operations at block 506 continue at block 508. Otherwise, operations at block 506 continue at block 512.

At block 508, the change propagator suspends execution of the current primary write request. With reference to the example depicted in FIG. 3, the change propagator 312 suspends execution of the primary write request. With reference to FIG. 8, as part of suspending execution, the change propagator can store the current primary write request at the bottom of the suspended primary write request queue 804. In this example, the suspended primary write request queue 804 is storing a number of primary write requests that have been suspended from execution (a primary write request 818, a primary write request 820, a primary write request 822, a primary write request 824, a primary write request 826, and a primary write request 828). The suspended primary write request queue 804 can be configured to store the primary write requests in a descending order based on length of time of suspension. Therefore, the primary write request that has been suspended the longest is stored on top, while the primary write request that has been suspended the shortest is stored on bottom. Thus, the current primary write request can be stored at the bottom below the primary write request 828 in the suspended primary write request queue 804. Further use of the suspended primary write request queue 804 is described below in the operations of the flowchart 600 of FIG. 6. Operations of the flowchart 500 continue at block 510.

At block 510, the change propagator determines whether the previous secondary write request has completed its update of the secondary data. With reference to the example depicted in FIG. 3, the change propagator 312 makes this determination. This determination can be made periodically. Alternatively, the change propagator 312 can monitor the execution of the previous secondary write request or can receive notification that the previous secondary write request has completed execution. If the previous secondary write request has not completed, operations of the flowchart 500 remain at block 510. Otherwise, operations of the flowchart 500 continue at the transition point A, which continues at transition point A in the flowchart 600.

Returning to the determination at block 506, if there is not a previous secondary write request (that is not yet completed execution) that is updating a data range that overlaps with the data range defined for the current primary write request, operations continue at block 512. At block 512, after detecting that there is no overlap, the change propagator can create a current secondary write request from the primary write request and transmit the current secondary write request to the secondary writer 316 for execution. With reference to the example depicted in FIG. 3, the change propagator 312 can create the current secondary write request 338 by replicating the primary write request 330. The change propagator 312 can then transmit the current secondary write request 338 to the secondary writer 316 for execution. Accordingly, the change propagator 312 can defer replicating the primary write request 330 to create the current secondary write request until the current secondary write request 338 is to be transmitted. Also in response to creating and transmitting the current secondary write request 338 to the secondary writer 316, the change propagator 312 can update data within the data range defined by the current primary write request 338.

Operations of the flowchart 500 continue at block 514. Operations of the flowchart 500 continue at transition point A, which continues at block 601 from transition point A in the flowchart 600.

Operations of the flowchart 600 of FIG. 6 are now described. The operations of the flowchart 600 can start at transition point A and continue at block 601.

At block 601, the secondary writer transmits, back to the primary storage node, confirmation that the sync replication for the previous secondary write request is complete. With reference to the example depicted in FIG. 3, the secondary writer 316 can transmit confirmation of sync replication (340) back to the primary storage node 302. Operations of the flowchart 600 continue at block 602.

At block 602, the change propagator determines whether there are any suspended write requests having a data range that at least partially overlaps with the data range associated with the secondary write request that is complete. With reference to the example depicted in FIG. 3, the change propagator 312 can make this determination. For example, the change propagator 312 can start at the top of the suspended primary write request queue 804 depicted in FIG. 8 and process the primary write requests until a primary write request is located that has a data range that overlaps with the data range associated with the secondary write request that has completed execution. As described above, the primary write requests can be ordered in the suspended primary write request queue 804 from top to bottom according to length of suspensions. Therefore, starting at the top and traversing down the suspended primary write request queue 804, the change propagator 312 can locate the primary write request whose data range overlaps with the previous data range that has been suspended the longest. As previously described, the current primary write request is stored at the bottom of the suspended primary write request queue 804. Thus, if there is at least one other primary write request that is suspended that is configured to modify at least part of the current data range, the change propagator 312 can locate the at least one other primary write request prior to locating the current primary write request while traversing the suspended primary write request queue 804 from top to bottom. The change propagator 312 can, therefore, determine if there is at least one other primary write request that is suspended that is also configured to modify at least a part of the current data range (to be modified by the current primary write request) based on traversal of the suspended primary write request queue 804.

Also, after locating a first primary write request that has been suspended the longest, the change propagator 312 can continue to traverse the suspended primary write request queue 804 to locate any other primary write requests that had data ranges that at least partially overlaps with the data range associated with the secondary write request that is complete. If a second primary write request is located below the first primary write request in the suspended primary write request queue 804 and if the data range for this second primary write request does not overlap with the data range for the first primary write request, this second primary write request can also be selected for execution. The change propagator 312 can continue to traverse the suspended primary write request queue 804 to locate any other primary write requests that can be selected for execution. For example, if a third primary write request is located below the second primary write request in the suspended primary write request queue 804 and if the data range for this third primary write request does not overlap with the data range for the first primary write request and the second primary write request, this third primary write request can also be selected for execution. Therefore, the change propagator 312 can select for execution any number of primary write requests that satisfy the data range overlapping (described above). If there are any suspended write requests having a data range that at least partially overlaps with the data range associated with the secondary write request that is complete, operations of the flowchart 600 continue at block 604. Otherwise, operations of the flowchart 600 are complete.

At block 604, the change propagator selects, among the suspended primary write request that have a data range that at least partially overlaps with the data range of the secondary write request that just complete, one or more primary write requests having non-overlapping data ranges. With reference to the example depicted in FIG. 3, the change propagator 312 can make this selection. As described above, the change propagator 312 can traverse the suspended primary write request queue 804 to locate one or more primary write requests that have a data range that at least partially overlaps with the data range of the secondary write request that just complete and that have a data range that is non-overlapping relative to each other. Also as described above, the primary write requests that have been suspended the longest can be given priority for selection and execution. Also, during operation, two or more consecutive write requests in the suspended primary write request queue 804 can update a same data range. If this situation occurs, the change propagator 312 can execute the one consecutive write request that has been in the suspended primary write request queue 804 the shortest time, while discarding the remaining consecutive write requests that have been in the suspended primary write request queue 804. Operations of the flowchart 600 continue at block 606.

At block 606, the change propagator creates secondary write request(s) based on the primary write request(s) and then transmits the secondary write request(s) to the secondary storage node for execution. For example, the change propagator can create secondary write request(s) by replicating the primary write request(s). With reference to the example depicted in FIG. 3, the change propagator 312 can transmit the secondary write request(s) to the secondary writer 316 in the secondary storage node 304 for execution. In response to receiving the secondary write request(s), the secondary writer 316 can update data within the data range defined by the secondary write request(s) in the secondary data 309. Operations of the flowchart 600 continue at block 608.

At block 608, the secondary writer transmits, back to the primary storage node, confirmation that the sync replication for the secondary write request(s) is complete. With reference to the example depicted in FIG. 3, the secondary writer 316 can transmit confirmation of sync replication (340) back to the primary storage node 302. Operations of the flowchart 600 return to block 602 to determine if there are any suspended write requests having a data range that at least partially overlaps with the data range associated with the secondary write request(s) that is complete.

While the operations depicted in FIGS. 5-6 are described using a queue (the suspended primary write request queue 804 of FIG. 8) that is shared for different data ranges in the secondary data, according to some other aspects multiple queues can be used such that each queue is associated with a different data range in the secondary data. For example, FIG. 9 depicts a number of suspended primary write request queues, wherein each suspended primary write request queue is associated with a data block to enable overlapping write detection and processing, according to some aspects.

FIG. 9 depicts a number of suspended primary write queues (a suspended primary write queue 902, a suspended primary write queue 904, and a suspended primary write queue 906). In this example, each suspended primary write queue is associated with a data block in the secondary data. However, according to some other aspects, each suspended primary write queue can be associated with other sizes of data (larger or smaller). For example, each suspended primary write queue can be associated with one or more bytes, multiple data blocks, etc. Also, according to some other aspects, the suspended primary write queues can be associated with different sizes of data. For example, some suspended primary write queues can be associated with data blocks, while other suspended primary write queues can be associated with a smaller subset of data.

The suspended primary write queue 902 is associated with data block 0. The suspended primary write queue 904 is associated with data block 1. The suspended primary write queue 906 is associated with data block X. The suspended primary write queue 902 is storing two suspended primary write requests (a primary write request 910 and a primary write request 912). The suspended primary write queue 902 is storing one suspended primary write request (a primary write request 914). The suspended primary write queue 906 is storing three suspended primary write requests (a primary write request 916, a primary write request 918, and a primary write request 920). Therefore, if a given data block is currently being updated by a secondary write request, any primary write requests that are received are stored in the suspended primary write queue associated with that data block.

Operations of the flowcharts 500-600 can execute similar to the description above with a shared queue. However with the use of multiple suspended primary write queues, the change propagator can traverse a suspended primary write queue that is associated with a data block for which a secondary write request has just completed updating and is now available for updating by a primary write request.

According to some aspects, one primary write request can update multiple data blocks. In such a situation, the primary write request is suspended from execution until all of the multiple data blocks to be updated are available. For example, assume that primary write request A is to update data block 0 and data block 1. Also, assume that data block 0 is currently being updated by secondary write request B and data block 1 is currently being updated by secondary write request C. Therefore, primary write request A is stored at the bottom of the suspended primary write queue 902 and is stored at the bottom of the suspended primary write queue 904. Assume that data block 1 becomes available because secondary write request C has completed its update to data block 1 but that data block 0 is still being updated by secondary write request B. In this example, the primary write request A would suspend any other primary write requests from updating data block 1 while continuing to wait for data block 0 to become available. Once data block 0 become available, a secondary write request can be created from the primary write request A and can then be executed to update data block 0 and data block 1.

FIGS. 8-9 depict some example data structures to ensure that the order that the primary write requests are received by the primary storage node is the order that secondary write requests are created and executed to update the secondary write data for overlapping writes. However, some aspects can use other types of data structures to provide the necessary protection to ensure proper order of execution and overlapping write detection and processing.

According to some aspects, the change propagator 312 might replicate I/O commands (including secondary write requests) in groups or batches to the secondary storage node 304. These batches can be referred to as "changesets". As the secondary storage node 304 receives the changeset, the I/O commands can be written to a log file. The primary storage node 302 can initiate a log change after the operations associated with the changeset have been sent. In response, the secondary storage node 304 can switch to a different log file. Any I/O commands (including additional secondary write requests) received after the log switch are inserted into the different log file while the I/O commands in the original log file are committed.

Although this description refers to individual logical storage objects being paired for synchronization relationships, the "endpoints" of a synchronization relationship can be groups of logical storage objects. A group of files or group of LUNs, for example, can be in a synchronization relationship with another group of logical storage objects. The nodes can maintain additional data to resolve group identifiers to the logical storage objects that are members of the group.

As will be appreciated by one skilled in the art, some aspects may be embodied as a system, method or computer program product. Accordingly, some aspects may take the form of entirely hardware, entirely software (including firmware, resident software, micro-code, etc.) or a combination of software and hardware aspects that may all generally be referred to herein as a "circuit," "module" or "system." Furthermore, some aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of various aspects may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some aspects are described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While various aspects are described with reference to various implementations and exploitations, it will be understood that these aspects are illustrative and that the scope of these aspects is not limited to them. In general, techniques for overlapping write detection and processing for sync replication as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the various aspects. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the various aspects.

What is claimed is:

1. A method comprising:
   replicating, by a first node, a write request to modify data stored by the first node as a replicated write request targeting second data stored by a second node based upon a sync mapping indicating that the write request is to be replicated to the second node;
   determining, by the first node, that the replicated write request overlaps a pending replicated write request pending at the second node based upon the replicated write request and the pending replicated write request targeting a same portion of a data range of the second data; and
   suspending execution of the write request at the first node upon the data stored by the first node until completion of the pending replicated write request at the second node upon the second data.

2. The method of claim 1, comprising:
   maintaining the sync mapping indicating synchronization configuration among logical storage objects of the first node and the second node.

3. The method of claim 2, comprising:
   specifying, within the sync mapping, a first mapping between a first logical object identifier of a first logical object stored by the first node to a second logical object identifier of a second logical object stored by the second node.

4. The method of claim 2, comprising:
   specifying, within the sync mapping, a first mapping between first filesystem location information of the first data stored by the first node to a second filesystem location information of the second data stored by the second node.

5. The method of claim 1, the determining that the replicated write request overlaps comprising:
   identifying i) a first data range, between a first offset and a second offset, targeted by the write request and ii) a second data range, between a third offset and a fourth offset, targeted by a first write request, targeting data of the first node, from which the pending replicated write request was replicated, wherein the replicated write request is determined as overlapping the pending replicated write request based upon the third offset being between the first offset and the second offset.

6. The method of claim 5, comprising:
   determining that the replicated write request overlaps the pending replicated write request based upon the fourth offset being between the first offset and the second offset.

7. The method of claim 5, comprising:
   determining that the replicated write request overlaps the pending replicated write request based upon the first offset being between the third offset and the fourth offset.

8. The method of claim 5, comprising:
   determining that the replicated write request overlaps the pending replicated write request based upon the second offset being between the third offset and the fourth offset.

9. The method of claim 1, comprising:
maintaining a range lock tree comprising a hierarchical tree structure with a root node and substrees of children nodes comprising a set of linked nodes, wherein a first node comprises a first data structure that stores a first data range that is currently locked and stores references to children nodes of the first node.

10. The method of claim 9, wherein the first data range is locked based upon a first pending replicated write request, targeting the first data range at the second node, that has not yet completed.

11. The method of claim 9, the determining that the replicated write request overlaps comprising:
traversing the range lock tree using a targeted data range of the write request to identify the pending replicated write request that has not completed at the second node based upon the range lock tree comprising a node corresponding to the targeted data range.

12. The method of claim 9, comprising:
traversing the range lock tree using a targeted data range of the write request to determine that there is no overlap of the replicated write request with pending replicated write requests at the second node based upon the range lock tree not comprising a node corresponding to the targeted data range.

13. A non-transitory machine readable medium comprising instructions for performing a method, which when executed by a machine, causes the machine to:
replicate, by a first node, a write request to modify data stored by the first node as a replicated write request targeting second data stored by a second node based upon a sync mapping indicating that the write request is to be replicated to the second node;
determine, by the first node, that the replicated write request overlaps a pending replicated write request pending at the second node based upon the replicated write request and the pending replicated write request targeting a same portion of a data range of the second data; and
suspend execution of the write request at the first node upon the data stored by the first node until completion of the pending replicated write request at the second node upon the second data.

14. The non-transitory machine readable medium of claim 13, wherein the instructions cause the machine to:
maintain a range lock tree comprising a hierarchical tree structure with a root node and substrees of children nodes comprising a set of linked nodes, wherein a first node comprises a first data structure that stores a first data range that is currently locked and stores references to children nodes of the first node.

15. The non-transitory machine readable medium of claim 13, wherein the instructions cause the machine to:
maintain the sync mapping indicating synchronization configuration among logical storage objects of the first node and the second node.

16. The non-transitory machine readable medium of claim 15, wherein the instructions cause the machine to:
specify, within the sync mapping, a first mapping between a first logical object identifier of a first logical object stored by the first node to a second logical object identifier of a second logical object stored by the second node.

17. The non-transitory machine readable medium of claim 15, wherein the instructions cause the machine to:
specify, within the sync mapping, a first mapping between first filesystem location information of the data stored by the first node to a second filesystem location information of the second data stored by the second node.

18. A computing device comprising:
a memory containing machine readable medium comprising machine executable code having stored thereon instructions for performing a method; and
a processor coupled to the memory, the processor configured to execute the machine executable code to cause the processor to:
replicate, by a first node, a write request to modify data stored by the first node as a replicated write request targeting second data stored by a second node based upon a sync mapping indicating that the write request is to be replicated to the second node;
determine, by the first node, that the replicated write request overlaps a pending replicated write request pending at the second node based upon the replicated write request and the pending replicated write request targeting a same portion of a data range of the second data; and
suspend execution of the write request at the first node upon the data stored by the first node until completion of the pending replicated write request at the second node upon the second data.

19. The computing device of claim 18, wherein the machine executable code causes the processor to:
maintain the sync mapping indicating synchronization configuration among logical storage objects of the first node and the second node.

20. The computing device of claim 19, wherein the machine executable code causes the processor to:
specify, within the sync mapping, a first mapping between a first logical object identifier of a first logical object stored by the first node to a second logical object identifier of a second logical object stored by the second node.

* * * * *